United States Patent [19]

Niwa

[11] Patent Number: 4,713,747
[45] Date of Patent: Dec. 15, 1987

[54] NUMERICALLY CONTROLLED MACHINING METHOD USING PRIMARY AND COMPENSATING CUTTERS

[75] Inventor: Tomomitsu Niwa, Aichi, Japan

[73] Assignee: Mitsubishi Denki Kabushiki Kaisha, Tokyo, Japan

[21] Appl. No.: 864,752

[22] Filed: May 14, 1986

Related U.S. Application Data

[63] Continuation of Ser. No. 532,133, Sep. 14, 1983, abandoned.

[30] Foreign Application Priority Data

Sep. 14, 1982 [JP] Japan .................................. 57-159872

[51] Int. Cl.$^4$ ............................................. G05B 19/18
[52] U.S. Cl. ...................................... 364/170; 364/474
[58] Field of Search ............... 364/170, 171, 474, 475, 364/513; 318/572, 594

[56] References Cited

U.S. PATENT DOCUMENTS

| | | | |
|---|---|---|---|
| 4,033,206 | 7/1977 | Morita et al. ....................... | 364/475 |
| 4,092,720 | 5/1978 | Casey .................................... | 364/474 |
| 4,328,550 | 8/1982 | Weber ................................... | 364/474 |
| 4,393,449 | 7/1983 | Takeda et al. ...................... | 364/474 |
| 4,445,182 | 4/1984 | Morita et al. ....................... | 364/474 |
| 4,456,962 | 6/1984 | Imazeki et al. ..................... | 364/474 |

Primary Examiner—Jerry Smith
Assistant Examiner—John R. Lastova
Attorney, Agent, or Firm—Sughrue, Mion, Zinn, Macpeak & Seas

[57] ABSTRACT

A workpiece is machined by a primary cutter such as on a lathe, in a primary machining mode, and then any workpiece portions left uncut by the primary cutter are machined by a compensation cutter in a compensation machining mode to thereby produce the desired final cut shape. To effect this cutting operation, data on the shape of the workpiece, the desired final cut shape, and the shape of the primary cutter are entered into an NC apparatus, and the uncut workpiece portions are computed based on data entered in the NC apparatus. A compensation cutter suitable for cutting off the computed uncut workpiece portions in the compensation machining mode is selected from a plurality of cutters, and data on the depth of cut and the clearance of the compensation cutter are set into the NC apparatus. Paths of travel of the compensation cutter as determined from the uncut workpiece portions, the depth of cut of the compensation cutter, and the clearance of the compensation cutter are computed in the NC apparatus. The uncut workpiece portions are then cut by the compensation cutter.

13 Claims, 14 Drawing Figures

NUMERICALLY CONTROLLED MACHINING METHOD USING PRIMARY AND COMPENSATING CUTTERS

This is a continuation of application Ser. No. 532,133 filed Sept. 14, 1983, now abandoned.

BACKGROUND OF THE INVENTION

1. Field of the Invention

The present invention relates to a numerically controlled machining method for controlling a machine tool having a numerical control apparatus so as to machine a workpiece, and more particularly to a numerically controlled machining method capable of easily cutting off any portion of the workpiece left uncut by a primary cutter.

2. Prior Art

Numerically controlled machine tools (hereinafter referred to as "NC machine tools") controlled by numerical control apparatus (hereinafter referred to as "NC apparatus") are given a tool position with respect to a workpiece under the command of numerical information, and are controlled by the results of arithmetic operations effected by the NC apparatus to enable the tool to machine the workpiece. NC machine tools can machine workpieces into complex configurations with ease and high precision at a high rate of production.

Figure 1:
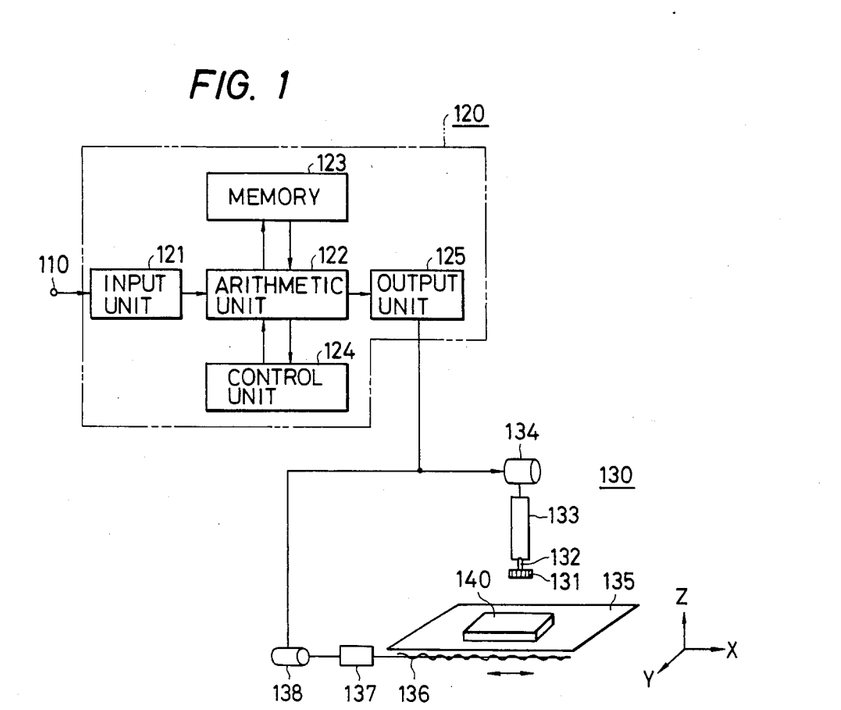
FIG. 1 is a schematic diagram of an NC machine tool.

An NC machine tool is generally constructed as shown in FIG. 1 of the accompanying drawings. The NC machine tool basically comprises an NC apparatus 120 for computing numerical information commands supplied from an external source through an input terminal 110 and a machine tool 130 controlled by the results of arithmetic operations effected in the NC apparatus 120. The NC apparatus 120 is composed of an input unit 121 to which external commands are supplied, an arithmetic unit 122 for computing the commands delivered from the input unit 121, a memory unit 123 for storing the results of arithmetic operations in the arithmetic unit 122 and the commands from the input unit 121, and other information, a control unit 124 for controlling the arithmetic operations in the arithmetic unit 122, and an output unit 125 for issuing commands or computed values such as the results of the arithmetic operations in the arithmetic unit 122.

The machine tool 130 has a tool 131 attached to a tool holder 132 mounted on the chuck of a spindle 133 which is rotatable by a spindle motor 134 driven by signals issued from the output unit 125 of the NC apparatus 120. A workpiece 140 to be machined by the machine tool 130 is fixed by jigs or the like to a table 135 of the machine tool 130. The machine tool 130 also includes a leadscrew 136 for moving the table 135 in the direction of the X axis. The leadscrew 136 is driven by an X-axis motor 138 through a gear box 137, the X-axis motor 138 being driven by signals from the output unit 125 of the NC apparatus 120. The machine tool 130 also includes mechanisms (not shown), identical to the X-axis drive motor 138 and the leadscrew 136 for moving the table 135 in the direction of Y- and Z-axes. These mechanisms are also driven by signals supplied from the NC apparatus 120.

Figure 2:
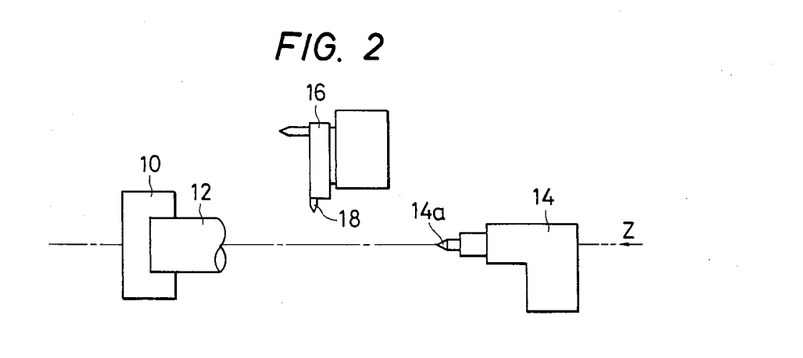
FIG. 2 is a schematic diagram of a lathe.

FIG. 2 schematically shows a lathe, as an example of an NC machine tool controlled by a numerically controlled machining method (hereinafter referred to as an "NC machining method").

A cylindrical workpiece 12 to be machined is held by a chuck 10 rotatable about a Z-axis and has an end supported by a tailstock center 14a of a tail stock 14. A turret 16 holds a tool 18 such as a cutter for cutting the workpiece 12. For cutting the workpiece 12, the turret 16 is moved in the direction of the Z-axis to cause the cutter 18 to cut the workpiece 12.

Figure 3:
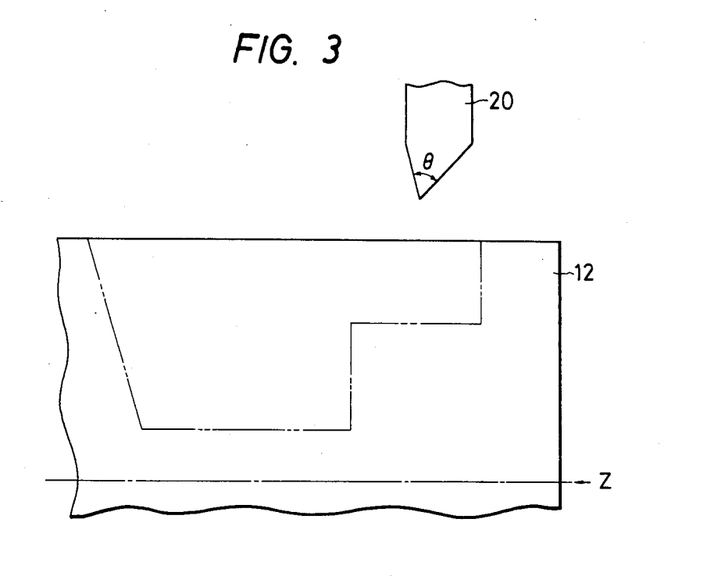
FIG. 3 is a view showing the shape of a workpiece, a final cut shape, and the shape of a primary cutter.
Figure 4:
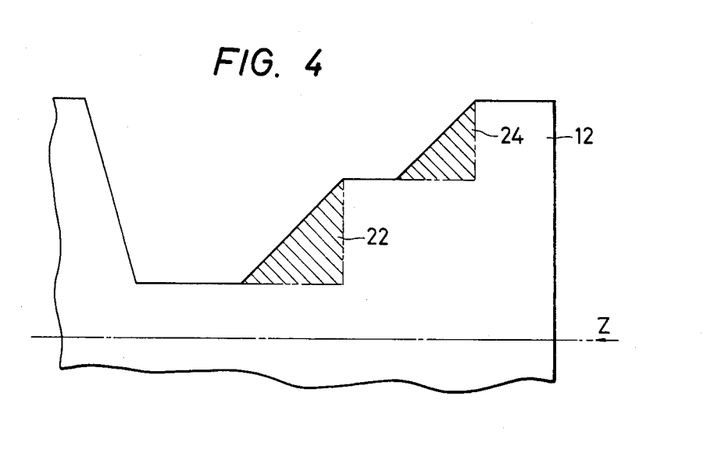
FIG. 4 is a view of workpiece portions left uncut.

FIG. 3 fragmentarily illustrates, on an enlarged scale, the workpiece 12 to be machined by a primary cutter 20 into a final profile indicated by the dot-and-dash line. However, the primary cutter 20 has a finite cutting angle 1 and fails to cut the workpiece 12 to the final contour, including planes perpendicular to the Z-axis, unless another suitable cutter is used, since the primary cutter 20 can only cut the workpiece 12 to a rough profile within the desired final shape shown in FIG. 3. Accordingly, after the workpiece 12 has been machined by the primary cutter 20, there are left uncut portions 22, 24, shown hatched in FIG. 4, which need to be removed. For removal of such uncut portions 22, 24, it has been customary for a programmer to measure their dimensions and to effect a separate processing step to cut off the portions 22, 24. Therefore, the conventional process for removing such unwanted uncut portions has been tedious and time-consuming.

SUMMARY OF THE INVENTION

With the foregoing prior difficulties in view, it is an object of the present invention to provide an NC machining method capable of cutting off uncut workpiece portions in a sequential cutting process.

Another object of the present invention is to provide an NC machining method for automatically removing workpiece portions left uncut by a primary cutter.

Still another object of the present invention is to provide an NC machining method capable of machining a workpiece efficiently with high precision and which is operable with ease.

The above objects can be achieved by an NC machining method in which a workpiece is first machined by a primary cutter in a primary machining mode and then machined by a compensation cutter in a compensation machining mode to cut off any workpiece portions left uncut due to the shape of the primary cutter, to thereby machine the workpiece to a desired final profile. The uncut workpiece portions are computed from the shape of the workpiece, the final machined profile, and the configuration of the primary cutter, for the purposes of selecting a suitable compensation cutter and determining the path of travel of the compensation cutter in the compensation machining mode.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENTS

Figure 5:
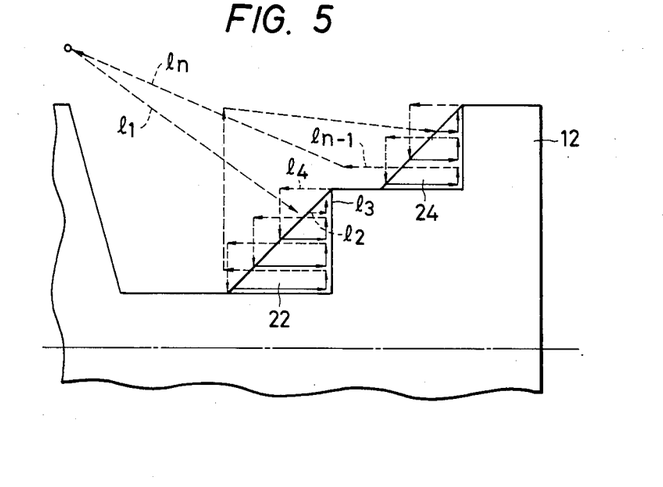
FIG. 5 is a view illustrative of the paths of travel of a compensation cutter according to the present invention.
Figure 6:
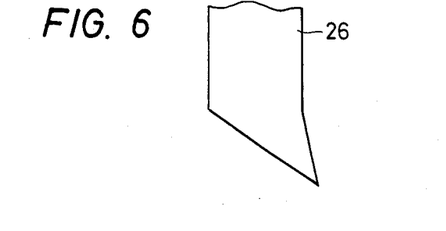
FIG. 6 is a view showing the shape of a compensation cutter.

FIG. 5 shows the path of travel of a compensation cutter, as determined by an NC machining method according to the present invention, and FIG. 6 is illustrative of the shape of a compensation cutter selected by the NC machining method for the cutter path shown in FIG. 5.

To find the path of cutting travel of the compensation cutter 26, data on the shape of the workpiece, the final cut shape, and the shape of the primary cutter 20 are entered into the NC apparatus after the workpiece has been machined by primary cutter 20, in order to determine uncut portions 22, 24. Then, a suitable compensation cutter 26 (FIG. 6) having a configuration suitable for cutting off the uncut portions 22, 24 is selected, and cutting paths l1–ln for the selected compensation cutter 26 are determined.

With this arrangement, therefore, a compensation cutter is selected and the cutting paths of the compensation cutter are determined after the workpiece has been machined by the primary cutter, so that the uncut workpiece portions can be automatically removed.

While in the embodiment of the present invention the uncut portions are computed from the workpiece shape, the final cut shape, and the shape of the primary cutter after the workpiece has been cut by the primary cutter 20, and the compensation cutter is then selected and the cutting paths of the compensation cutter are determined, uncut portions may be computed in advance from the workpiece shape, the final cut shape, and the shape of the primary cutter before the workpiece is cut by the primary cutter 20, and the compensation cutter may be selected and the cutting paths of the compensation cutter may be determined. Furthermore, the selection of a compensation cutter according to the present invention may include an automatic cutter changing operation for replacing the primary cutter with the compensation cutter.

Figure 7:
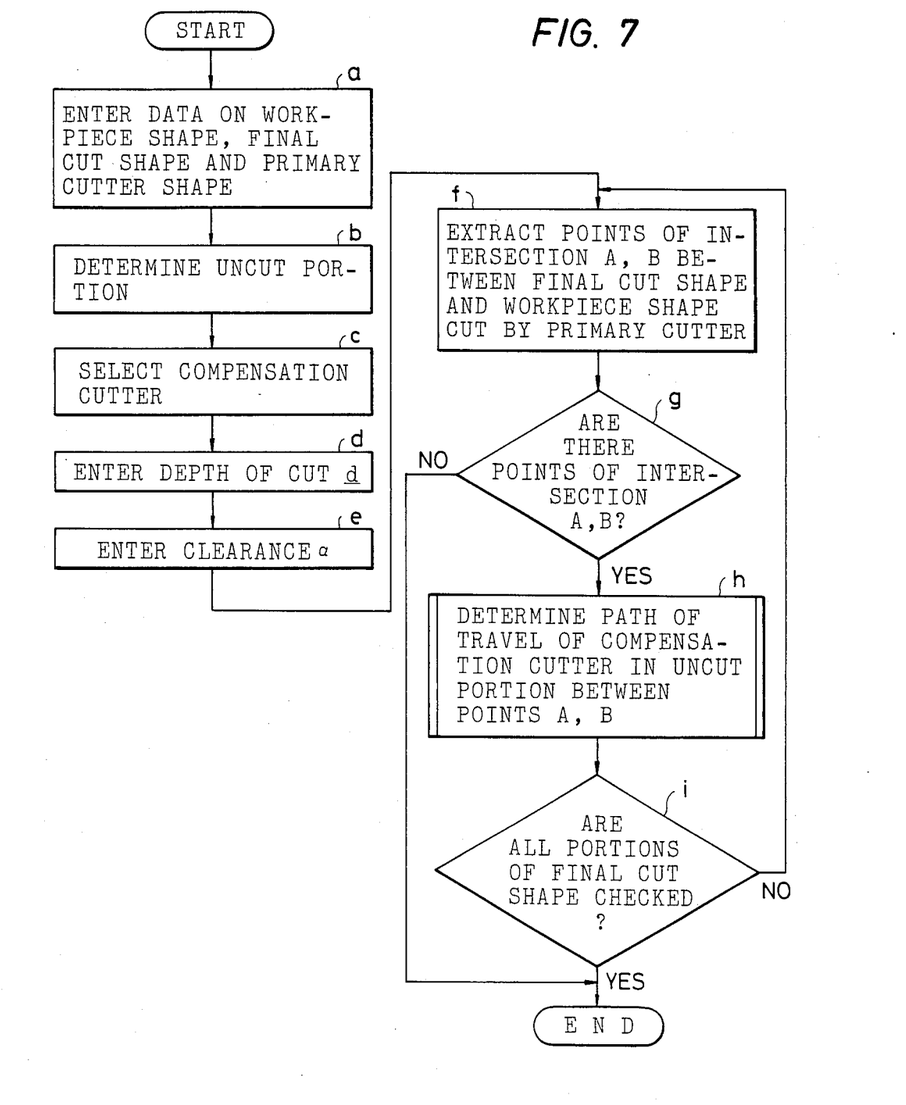
FIG. 7 is a flowchart for determining the paths of travel of the compensation cutter.

FIG. 7 is s flowchart of the steps of the NC machining method of the invention for determining the cutting paths of the compensation cutter as shown in FIG. 5.

In FIG. 7, data on the workpiece shape, the final cut shape, and the primary cutter configuration are entered into the NC apparatus at a step a, uncut workpiece portions are determined from these data at a step b, and a compensation cutter suitable for cutting off the determined uncut portions is selected at a step c.

Figure 8:
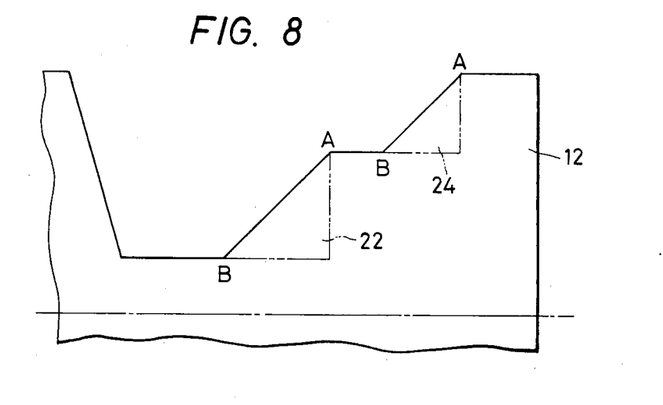
FIG. 8 is a view showing points of intersection A and B between the final cut shape and the shape of the workpiece as it is cut in the primary machining mode.

Then, data on the cutting depth d and the clearance α for the compensation cutter are entered into the NC apparatus at steps d, e, respectively, to extract points A, B (FIG. 8) of intersection between the final cut shape and the shape cut by the primary cutter in a step f in FIG. 7. If there are no intersection points A, B, then the machining operation is finished. If there remain intersection points A, B, that is, if there is any workpiece portion left uncut, in a step g, then paths of travel of the compensation cutter between the points A, B to cut off the uncut portions are determined in a step h. The above operation is effected until the final cut shape is achieved in a step i.

Figure 9:
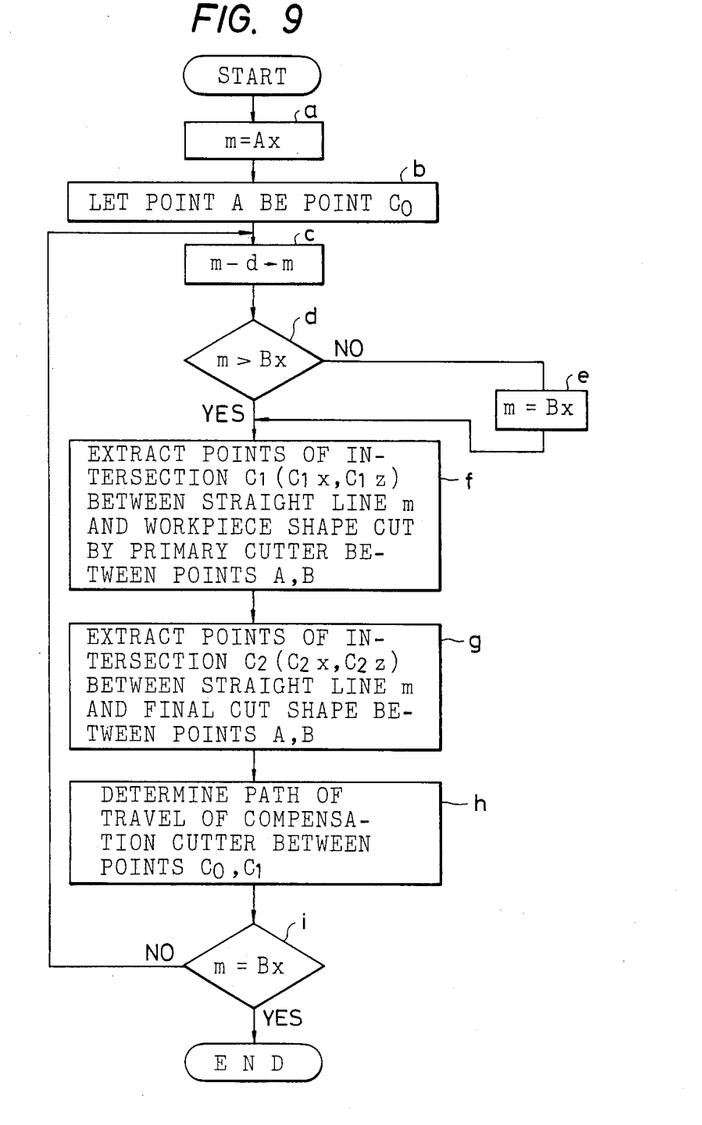
FIG. 9 is a flowchart of the step of "find paths of travel of the compensation cutter for cutting off the uncut portions between points A, B" in FIG. 7.

FIG. 9 is a flowchart for the step h (FIG. 7) in which the paths of travel of the compensation cutter between the points A, B are found.

Figure 10:
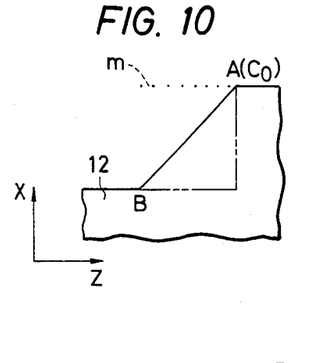
FIGS. 10 and 11 are views showing straight lines m.

It is first assumed that the straight line at a maximum intersection point on the X-axis in an uncut portion as shown in FIG. 10 is expressed as m = Ax in step a in FIG. 9. The intersection point A is set at a point C0 in step b.

Figure 11:
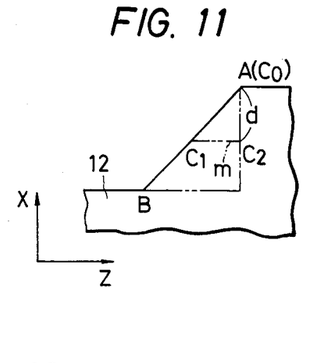

The straight line m is renewed in step c as m–d, which is the difference between the straight line and the depth of cut d of the compensation cutter 26 as shown in FIG. 11. Step d in FIG. 9 determines whether the straight line m is larger than an X-axis corrdinate Bx of the intersection point B. If m > Bx, then the program proceeds to the following step f, and if m < Bx, then m is equalized to Bx in step e and the program goes to step f. A point of intersection C1 (C1x, C1z) between the straight line m and the contour cut by the primary cutter between the points A, B as shown in FIG. 11 is extracted in step f in FIG. 9. Then, a point of intersection C2 (C2x, C2z) between the straight line m and the final cut shape between the points A, B is extracted in step q. A path of travel of the compensation cutter is now determined between the points C0, C1 in a step h. The above routine is repeated until m = Bx in step i. A path of travel of the compensation cutter between the points A, B can be determined in this manner.

Figure 12:
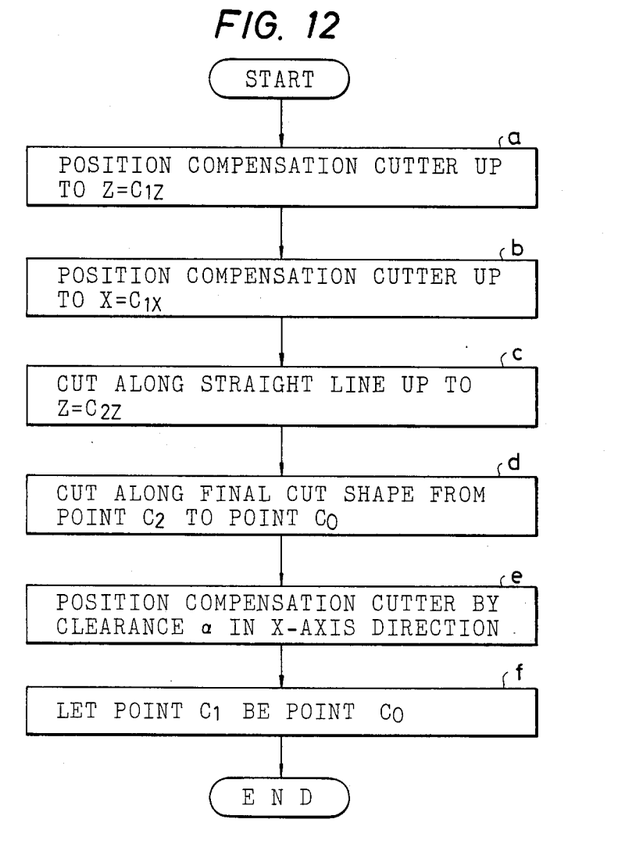
FIG. 12 is a flowchart of the step of "find paths of travel of the compensation cutter between points C0, C1" in FIG. 9.
Figure 13:
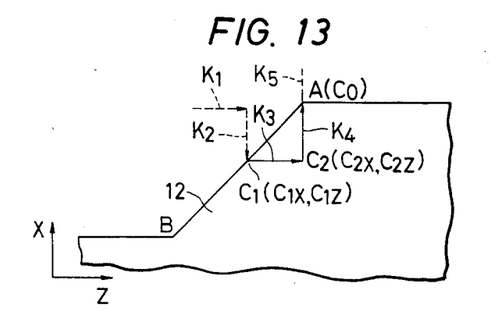
FIG. 13 a view showing a unit path of travel of the compensation cutter.

FIG. 12 is a flowchart of the step h (Fig, 9) of finding the path of travel of the compensation cutter between the points C0, C1. FIG. 13 shows a unit path of travel of the compensation cutter thus determined.

In FIGS. 12 and 13, the compensation cutter is positioned to a point Z = C1z along a line k1 in step a (FIG. 12), then up to a point X = C1x along a line K2 in a step b. Thereafter, the compensation cutter is directed to cut the workpiece along a straight line K3 up to a point Z = C2z in step c, and then along a straight line K4 from the point C2 to the point c0 in step d to follow the final cut shape. Then, the compensation cutter is displaced from the point A (C0) by the distance α (clearance) along a straight line K5 in the X-axis direction in step e. Thereafter, the point C1 is used as the point C0 in a step f. Thus, the path of travel of the compensation cutter, composed of the straight lines K1 through K5, can be defined.

Figure 14:
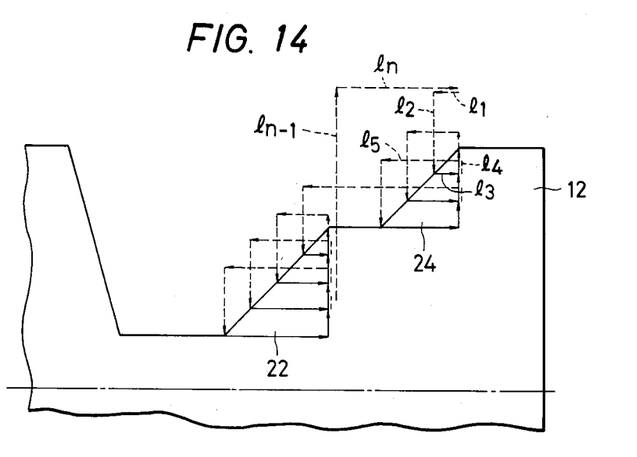
FIG. 14 is a view showing paths of travel of the compensation cutter.

FIG. 14 shows the final paths l1–ln of travel of the compensation cutter as determined by the NC machining method as described with reference to FIGS. 7 through 13. As will be understood from FIG. 14, the uncut portions 22, 24 of the workpiece can be automatically removed.

With the arrangement of the invention, as described above, any uncut portions of a workpiece are determined from the shape of the workpiece, the final cut shape, and the shape of the primary cutter, a compensation cutter is selected and paths of travel of the compensation cutter are determined, for compensatory cutting of the workpiece with the compensation cutter for automatically removing the uncut portions.

Although a certain preferred embodiment has been shown and described, it should be understood that many changes and modifications may be made therein without departing from the scope of the appended claims.

What is claimed is:

1. An NC machining method for machining a workpiece with a primary cutter in a primary machining mode and then machining workpiece portions left uncut by the primary cutter with a compensation cutter in a compensation machining mode to thereby produce a desired final cut shape, said NC machining method comprising the steps of:
   entering data on the original shape of the workpiece, the desired final cut shape, and the shape of the primary cutter into an NC apparatus;
   automatically determining the uncut workpiece portions based on said entered data, said uncut workpiece portions comprising those portions of said workpiece which must be cut to achieve said final cut shape, but which cannot be reached using said primary cutter;
   automatically selecting a compensation cutter suitable for cutting off said uncut workpiece portions in the compensation machining mode;
   setting data on the depth of cut and selecting the clearance of the compensation cutter, said clearance being selected by setting a distance between the compensation cutter and workpiece so as to prevent the compensation cutter from contacting the workpiece;
   determining paths of travel of said compensation cutter from the uncut workpiece portions, the depth of cut of said compensation cutter, and said clearance of said compensation cutter; and
   cutting off said uncut workpiece portions by moving said compensation cutter along the determined paths of travel.

2. An NC machining method according to claim 1, wherein said data on said shapes are entered in the form of coordinates.

3. An NC machining method according to claim 1, wherein said uncut workpiece portions are determined by determining the workpiece portions to be cut from data on the desired final cut shape and the shape of the workpiece, and effecting an arithmetic operation on the determined workpiece portions to be cut and a cutting angle of the primary cutter.

4. An NC machining method according to claim 1, wherein said compensation cutter is selected from a plurality of cutters and has a shape which is optimum for cutting off the uncut workpiece portions.

5. An NC machining method according to claim 4, wherein data on said plurality of cutters are stored in a memory of the NC apparatus.

6. An NC machining method according to claim 5, wherein the primary cutter is replaced with the compensation cutter by automatic cutter changing means.

7. An NC machining method according to claim 1, wherein said paths of travel of the compensation cutter are determined by the steps of:
   computing first and second points of intersection between the desired final cut shape and a workpiece shape cut by the primary cutter;
   determining whether there are such points of intersection;
   computing paths of travel of the compensation cutter for cutting off the uncut portions between the first and second points of intersection; and
   effecting operations until no points of intersection are found with respect to the desired final cut shape.

8. An NC machining method according to claim 7, wherein said paths of travel of the compensation cutter are determined by substracting the depth of cut of the compensation cutter from a value corresponding to a position on a first coordinate axis of the first point of intersection.

9. An NC machining method according to claim 8, wherein said depth of cut is subtracted from the difference between the coordinates of the first and second points of intersection on said first coordinate axis.

10. An NC machining method according to claim 9, wherein said paths of travel of the compensation cutter are defined by the repeated steps of moving the compensation cutter by the depth of cut along said first coordinate axis, enabling the compensation cutter to cut the workpiece up to the coordinate of the final cut shape on a second coordinate axis, and spacing the compensation cutter from the workpiece by a distance corresponding to the clearance.

11. An NC machining method according to claim 1, wherein said paths of travel of the compensation cutter are determined after the primary cutter has machined the workpiece.

12. An NC machining method according to claim 1, wherein said paths of travel of the compensation cutter are determined at the same time that the primary cutter machines the workpiece.

13. An NC machining method according to claim 1, wherein said NC apparatus controls a lathe.

* * * * *